(12) United States Patent
Xu et al.

(10) Patent No.: US 10,574,099 B2
(45) Date of Patent: Feb. 25, 2020

(54) OPTIMIZED STATOR TOOTH FOR ELECTRIC MOTOR/GENERATOR

(71) Applicant: FORD GLOBAL TECHNOLOGIES, LLC, Dearborn, MI (US)

(72) Inventors: Wei Xu, Canton, MI (US); Zhichun Ma, Ann Arbor, MI (US); Shuzhen Liu, Novi, MI (US); Jiyao Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 15/474,769

(22) Filed: Mar. 30, 2017

(65) Prior Publication Data

US 2018/0287436 A1    Oct. 4, 2018

(51) Int. Cl.
| | |
|---|---|
| *H02K 5/24* | (2006.01) |
| *H02K 1/14* | (2006.01) |
| *H02K 7/00* | (2006.01) |

(52) U.S. Cl.
CPC ............ *H02K 1/146* (2013.01); *H02K 7/006* (2013.01); *H02K 2213/03* (2013.01); *Y02T 10/641* (2013.01)

(58) Field of Classification Search
CPC .......... H02K 1/146; H02K 1/16; H02K 1/165; H02K 15/024; H02K 1/06; H02K 3/12; H02K 1/265; H02K 3/48
USPC ............................... 310/51, 216.088–216.097
See application file for complete search history.

(56) References Cited

U.S. PATENT DOCUMENTS

| | | | |
|---|---|---|---|
| 6,744,171 B1 | 6/2004 | Kolomeitsev | |
| 6,867,524 B2 | 3/2005 | Liang | |
| 8,120,223 B2 | 2/2012 | Leonardi et al. | |
| 8,436,504 B2 | 5/2013 | Liang et al. | |
| 8,461,739 B2 | 7/2013 | Liang et al. | |
| 8,841,813 B2 | 9/2014 | Junak et al. | |
| 9,035,522 B2 | 5/2015 | Liang et al. | |
| 2009/0243423 A1* | 10/2009 | Hattori | H02K 1/165 310/216.092 |
| 2011/0074243 A1* | 3/2011 | Liang | H02K 1/165 310/216.112 |

(Continued)

*Primary Examiner* — Thanh Lam
(74) *Attorney, Agent, or Firm* — David B. Kelley; Brooks Kushman P.C.

(57) ABSTRACT

An electric motor/generator includes a stator-core enclosing a rotor-core, which are each formed from stacked annular laminates. The stator-core laminates are configured to reduce vibration, and each have teeth extending radially inward from a root of an annular stator yoke/back-iron, to a flux-cap. Each tooth is formed to have opposite, lateral-edges spaced a distance-apart that changes between the root to the flux-cap, to establish a variable tooth-stiffness and a predetermined mechanical-resonance of the tooth. The opposite lateral-edges may each be configured with either a linear or a non-linear, curved edge-profile, and to have the variable tooth-stiffness and the lateral-edge distance-apart changing or decreasing between the root and the flux-cap. Each tooth may also have an edge-profile that is different from at least one adjacent tooth, and which is configured with a variable tooth-stiffness and a predetermined mechanical resonance that is different from the at least one adjacent tooth.

16 Claims, 5 Drawing Sheets

(56) References Cited

U.S. PATENT DOCUMENTS

| | | | | |
|---|---|---|---|---|
| 2012/0112594 A1* | 5/2012 | Sano | ............... | H02K 1/146 |
| | | | | 310/159 |
| 2012/0256514 A1* | 10/2012 | Junak | ............... | H02K 1/146 |
| | | | | 310/216.092 |
| 2013/0229085 A1* | 9/2013 | Zhang | ............... | H02K 1/16 |
| | | | | 310/216.092 |
| 2015/0200571 A1* | 7/2015 | Katou | ............... | H02K 1/165 |
| | | | | 310/216.096 |

* cited by examiner

OPTIMIZED STATOR TOOTH FOR ELECTRIC MOTOR/GENERATOR

TECHNICAL FIELD

The invention relates to a stator design for an electric machine configured as a motor and a generator.

BACKGROUND

In hybrid electric vehicles (HEVs) having one or more electric machines or electric traction motor/generators (M/Gs), there is a continuing effort to reduce the noise, vibration, and harshness (NVH), which can be associated with various modes of operation. During operation, M/Gs may generate noise and vibration that may be transmitted to the body and frame of the HEV, causing a perception of harshness by HEV occupants. Attempts have been made to reduce such harshness and the underlying noise and vibration of M/Gs, and include efforts to mitigate torque ripple and related harmonics by structural dampening, and various adjustments to M/G rotor and stator components such as magnets, excitation coil windings, and stator/rotor teeth, which modifies aspects of such noise and vibration.

It is known practice in the design of a brushless, multiple-phase motor-generator to include a stator having stator teeth excited with wire coil windings. The stator commonly defines an interior, cylindrical opening that receives a multi-tooth rotor that includes permanent magnets arranged on its periphery to form the teeth. The stator and rotor teeth interact across a small cylindrical air gap, as magnetic flux pattern develops when the stator coils, wound on the stator teeth, are energized with a multi-phase sinusoidal voltage. The output torque of such a multi-phase M/G includes uniform/fundamental and varying/harmonic torque components. The fundamental component establishes the primary torque output of the M/G. The harmonic and varying torque component creates torque oscillations and vibrations in the torque output, due to harmonic magnetic flux distributions arising from the magnetic response of the air-gap, the stator, and the rotor. The total torque output of the electric machine is the combination of the uniform and varying components, and includes a phenomenon referred to as torque ripple. Torque ripple causes speed oscillations in the HEV drive-train, which causes vibration and noise as the vibrations resonate in the body and frame of the HEV. Torque ripple occurs at multiple frequencies, but is particularly significant at low vehicle speeds because lower frequency vibration and noise are more difficult to dampen.

The traditional stator tooth shape has a constant width from root to edge, and has a generally rectangular shape. Some have attempted to improve electro-magnetic performance and reduce NVH by incorporating varying widths of such teeth, modifying the air-gap face of the teeth to have an irregular undulating surface, and varying the size of the slots defined between the teeth. Such attempts are directed to achieve an optimal back-EMF shape, among other electro-magnetic properties, which reduces torque ripple. Despite these efforts, M/G noise and vibration persist and the need to further reduce the resultant harshness remains.

SUMMARY

The present disclosure enables new capabilities for improved stator mechanical performance and efficiency as well as improved NVH of such M/Gs, and is directed to modifications to traditional stator teeth of the M/G to have improved, variable cross-sections that are tuned to improve the mechanical stiffness of the stator teeth. The variable cross-section has been found to improve stiffness, and to also create design opportunities to reduce weight, to enable new stator coil winding arrangements, and to offer improved mechanical performance by enabling stiffness designs that low frequency resonance vibrations to higher, less perceptible and more easily damped frequencies.

Additionally, the new stator configuration may offer added opportunities for improvements in back-EMF, field weakening, and winding packaging for stator yoke cooling, among other possible improvements. More specifically, the improved stator configuration enables opportunities for improved structural topology and shape optimization of the teeth of the M/G stator to reduce and/or adjust NVH properties.

The disclosure is directed to an electric motor/generator (M/G) that includes a rotor-core received within an annular stator-core, with the annular stator-core formed from and including a plurality of stacked annular stator yoke laminations and/or laminates. Each lamination in the stator stack is formed from a thin, planar sheet and includes a plurality of teeth that extend radially inward from a root of the annular yoke to a flux-cap, and towards a center of the annular stator yoke lamination. Each of the teeth define interstitial slots therebetween. Each tooth and each slot are aligned about radial pitch axes that extend perpendicularly from a stator-core rotational axis. Each tooth is formed with having opposite, lateral-edges that are spaced a distance-apart. The distance apart changes along the pitch axis, between the root and the flux-cap, which establishes a variable tooth-stiffness and a predetermined mechanical-resonance of the tooth. Each tooth is further formed to have the opposite lateral-edges being symmetrical or asymmetrical about a radial pitch-axis.

The disclosure also contemplates variations of the teeth where each of the opposite lateral-edges may be configured to have a non-linear, curved edge-profile. Further, these variations may also have the variable tooth-stiffness and the lateral-edge distance-apart configured to decrease between the root and the flux-cap, such that the distance-apart at the root exceeds the distance-apart at the flux-cap. In a different arrangement, the disclosure includes the opposite lateral-edges configured to be non-parallel, with each lateral-edge having a linear edge-profile that causes the variable tooth-stiffness and the lateral-edge distance-apart to decrease between the root and the flux-cap.

Here too, the distance-apart at the flux-cap is less than the distance-apart at the root. In further modifications to the arrangements of the disclosure, each tooth may also have an edge-profile that is different from at least one adjacent tooth. In this adaptation, adjacent or neighboring teeth may be configured to have different respective variable tooth-stiffnesses and different predetermined mechanical resonances. The different respective edge-profiles of adjacent teeth establish a plurality of variable tooth-stiffnesses and a plurality of predetermined mechanical resonances. Other modifications include each tooth in the plurality to also have respective edge-profiles that may alternate from tooth to tooth between two or more different edge-profiles. The contemplated plurality of teeth may further include two or more sub-groups of teeth, wherein each sub-group is configured such that each tooth in the sub-group has respective edge-profiles that alternate, from one sub-group to the next, between two or more different edge-profiles.

The disclosure is further directed to methods of controlling vibration, noise, and harshness of the M/G. One of the methods includes forming the annular stator yoke lamination to include the plurality of teeth, which each extend radially inward from the root of the annular yoke to the air-gap surface of the flux-cap. As with earlier described configurations, the methods also include establishing the variable tooth-stiffness and the predetermined mechanical-resonance of the tooth by forming each tooth to have the opposite, lateral-edges spaced the distance-apart, which changes between the root and the flux-cap. In alternative arrangements of the methods, included is arranging the opposite lateral-edges to have the non-linear, curved edge-profile having the variable tooth-stiffness and the lateral-edge distance-apart decreasing between the root and the flux-cap.

Additional method variations include arranging the opposite edges to have the linear profile to have the variable tooth-stiffness and the lateral-edge distance-apart decreasing between the root and the flux-cap. The disclosure also contemplates the method of controlling vibration including arranging each tooth to have the edge-profile to be different from the at least one adjacent tooth, and configured with the variable tooth-stiffness and the predetermined mechanical resonance that is different from the at least one adjacent tooth. The methods further may include establishing, with the respective edge-profiles, the plurality of variable tooth-stiffnesses and the plurality of predetermined mechanical resonances.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale, and may depict various features to be exaggerated in profile, form, and/or configuration for purposes of illustrating features that may be far less exaggerated in applications according to the disclosure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the conventional, prior art M/G stators such as those described herein above, stator tooth shape is rectangular and may include various rectangular shapes designed to affect excitation flux, in attempts to reduce torque ripple. The disclosure includes an electric motor/generator (M/G) of the type often used for electric and hybrid electric vehicles (HEVs). The improved M/G achieves enhanced noise, vibration, and harness (NVH) performance by incorporating a modified and more structurally optimal topology or shape of a stator tooth without impact on torque performance and M/G weight.

This disclosure includes examples of optimized shape of the stator tooth, which has been found to reduce the overall stator vibration, especially at motor speeds where the frequency of the tooth electromagnetic force is close to the tooth resonant frequency(ies). In turn, reduced noise and harshness are apparent. While attempts have been made to reduce NVH due to tooth tangential force (torque ripple) and radial force, opportunities exist to improve the structural configuration so as to further improve NVH characteristics. The new stator configurations include designs for variable, adjusted, tuned, and increased stiffnesses of the stator tooth. This approach shifts pronounced first-order resonant, vibrational M/G stator tooth natural frequencies away from excitation frequencies of typical operating M/Gs, and away from frequency ranges readily noticeable by HEV occupants, to higher frequencies that are not close to excitation operating frequencies, and which are less noticeable to occupants, and more easily dampened and attenuated by the usual and typical configurations of the frames and bodies of typical HEV constructions (which typically naturally absorb and attenuate such higher frequencies, and which are otherwise also less susceptible to resonances at such higher frequencies).

Figure 1:
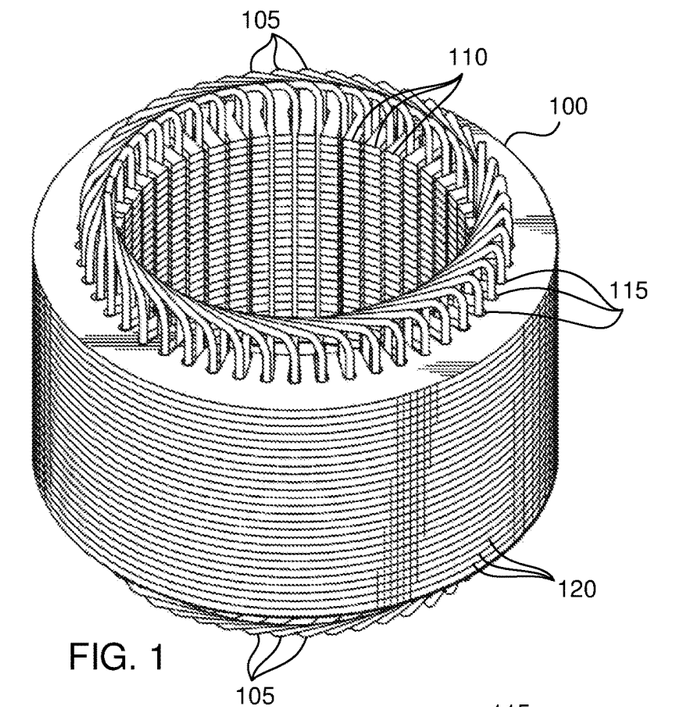
FIG. 1 is an isometric view of a stator that includes a stack of laminations, and having radially inwardly extending teeth that define interstitial slots that receive electrical excitation coil windings through the slots and about the teeth.
Figure 2:
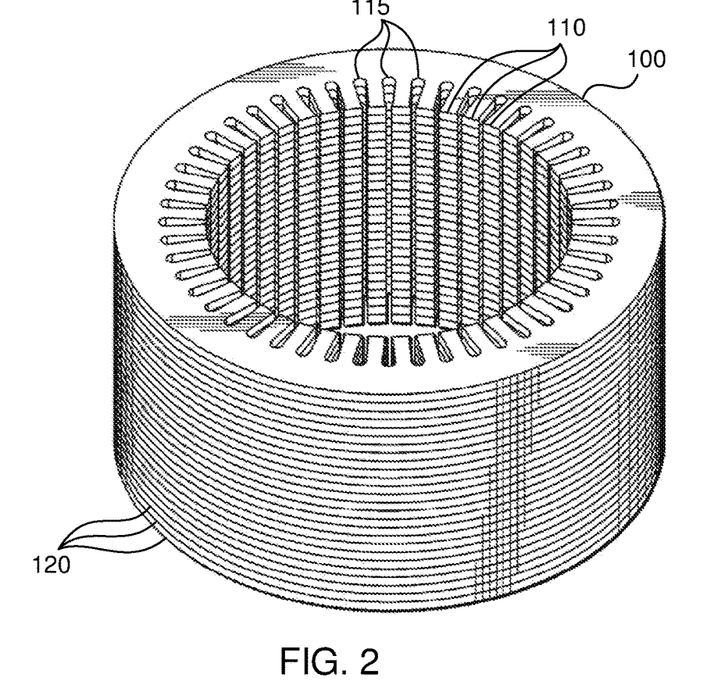
FIG. 2 is an isometric view of the stator of FIG. 1, with the electrical windings removed for illustration purposes.

With reference now to the various figures, and specifically to FIG. 1, the disclosure describes an electric motor/generator (M/G) (not shown) that includes a rotor-core (not shown), which is rotationally received within an annular stator-core 100, and which is separated therefrom by a relatively small air-gap. The annular stator-core of FIG. 1 is depicted with excitation coil windings 105, which are wound about a plurality of stator teeth 110 in groups of coils that establish magnetic poles. The plurality of teeth defines a plurality of interstitial slots 115, through which the coils 105 are wound about the teeth 110. FIG. 2 depicts the stator-core of FIG. 1 with the excitation coil windings 105 removed. The annular stator-core 100 is formed from and includes a plurality of stacked annular stator yoke laminations 120. Although shown in FIGS. 1 and 2 to have approximately twenty-seven laminations, M/Gs that are utilized for HEVs may stack between about 100 and about 500 laminations, and sometimes about 300 or so laminates and/or laminations 120, to form an exemplary stacked stator-core 100. When so assembled, an HEV compatible stator-core 100 may have a stack length that ranges between about 40 millimeters (mm) and about 150 mm, or more or less, depending upon the application and performance requirements.

Each of the laminations of the plurality 120 is formed from a thin, planar sheet of a ferrous material, which is typically selected from one of a number of electrical steels. The electrical steel is often manufactured as coils of thin sheets, usually having a thickness of two millimeters or less, which minimizes cross-sectional area of the stacked plurality of laminations 120 to reduce eddy-current/hysteresis power loss and heating during magnetic flux cycling. The laminations and/or laminates 120 contemplated by this disclosure may have a thickness in the range of about 0.2 mm and about 0.35 mm, and perhaps between about 0.25 mm and about 0.27 mm, or so.

Various types of ferrous materials are used for rotor-cores and stator-cores 100, and include for example, what are often referred to by those working in the technology area as electrical steels, lamination steels, and/or silicon steels, among other names. For purposes of the disclosure, such electrical steels are usually formulated to have properties designed for use with electric M/Gs. Electrical steel for M/Gs is often designed to have high permeability to magnetic flux and specific electro-magnetic properties according to preferred M/G performance requirements.

Figure 3:
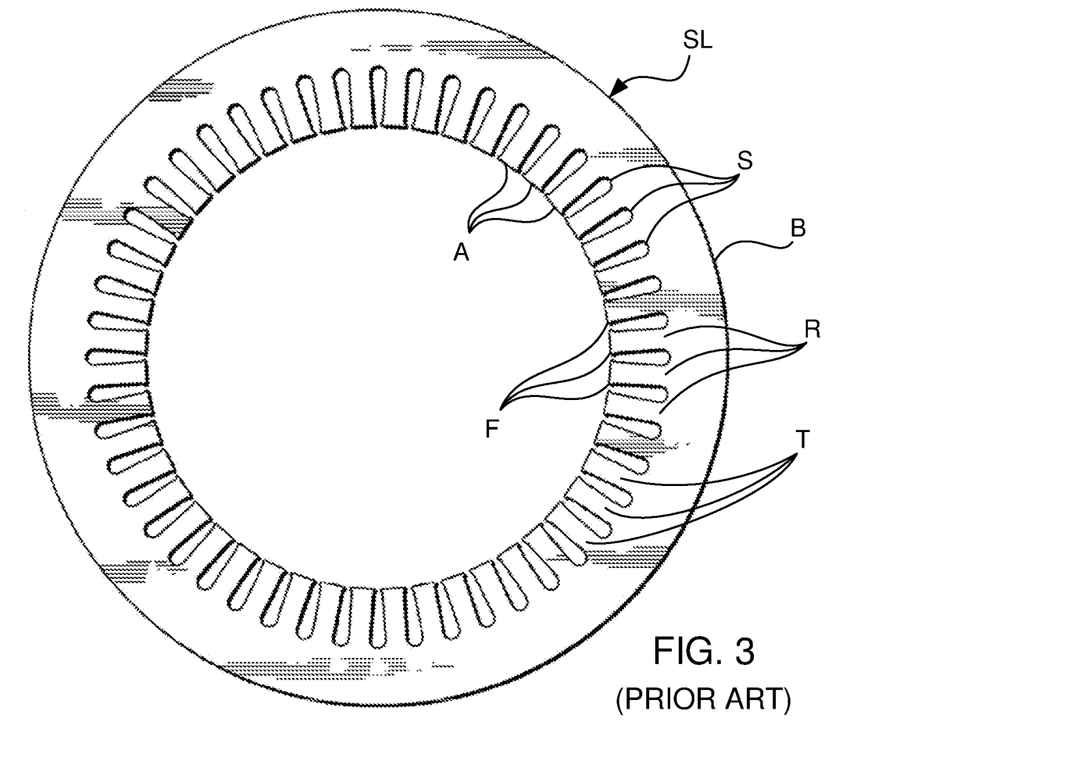
FIG. 3 is a plan view of a single lamination of a prior art stator having constant width teeth.
Figure 4:
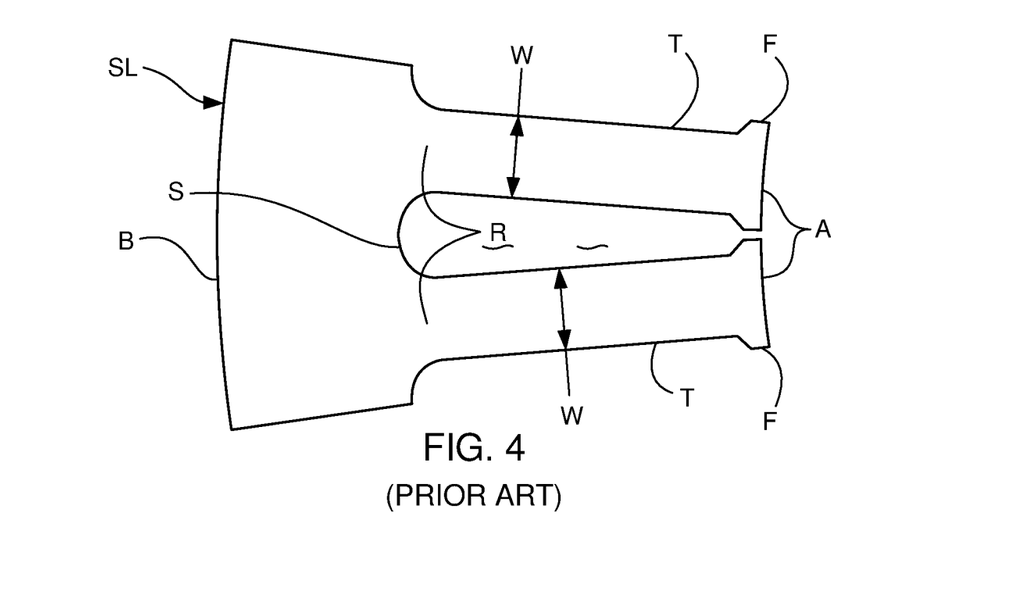
FIG. 4 is an enlarged, plan view of two constant-width teeth of the prior art stator of FIG. 3.

With reference now also to FIGS. 3 and 4, a prior art configuration for a stator lamination SL is shown, which includes radially aligned teeth T, which define slots S of a fixed-area that are designed to hold coil windings and to meet desired back-EMF (electromotive force) waveforms during operation. Each tooth T extends radially from a root R about a stator back-iron B, inward to a flux-cap F, having an air-gap surface A. Each of the prior art stator teeth T are formed with parallel edges having constant width W, which results in each tooth T having a constant stiffness, bending-moment, and mechanical resonance.

Figure 5:
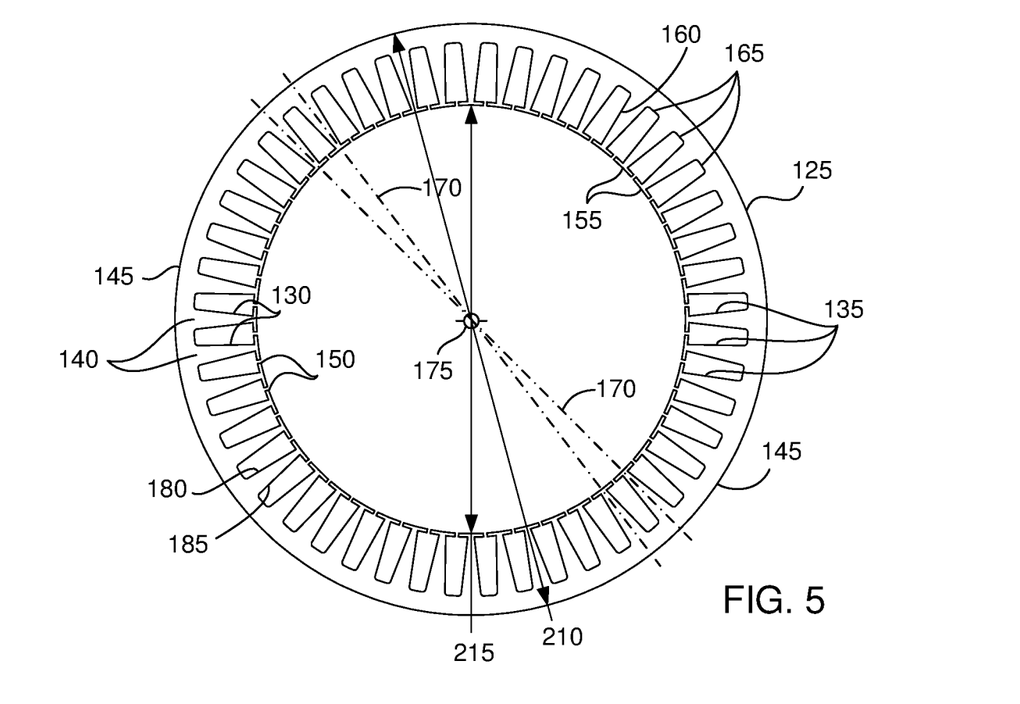
FIG. 5 illustrates a plan view of a single lamination of an improved stator according to the disclosure, which includes variable width teeth.
Figure 6:
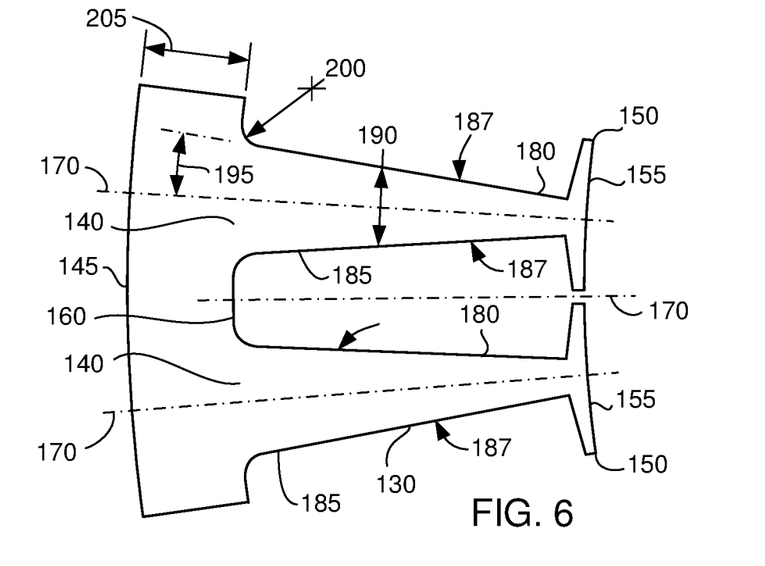
FIG. 6 depicts an enlarged plan view of two teeth of the improved stator of FIG. 5.

With continuing attention to the preceding figures, and now also to FIGS. 5 and 6, a plan view, not drawn to scale and with some features exaggerated for illustration purposes according to the disclosure, is depicted in FIG. 5. A new single, annular stator yoke lamination and/or laminate 125 is shown in FIG. 5, which is stacked to form stator-core 100. An enlarged view is illustrated in FIG. 6 (also not to scale), to show two teeth 130 of a plurality of the teeth 135 of the lamination or laminate 125 of FIG. 5. The improved lamination and/or lamination 125 of FIGS. 5 and 6, includes the plurality of teeth 135, which extend radially inward towards a center of the lamination 125, from a root 140 of an annular yoke and/or back-iron 145 to a flux-cap 150 that has an air-gap surface 155. Each of the teeth of the plurality of teeth 135 define an interstitial slot 160 between each of the teeth 130, which forms a plurality of such slots 165. As shown here for purposes of illustration and example, the lamination and/or laminate 125 includes 48 teeth 130 in the plurality of teeth 135. While various arrangements are contemplated, the 48-tooth configuration may be utilized in a 4 or 6 or 8 or 10 or 12-pole excitation coil arrangement, and typically in an 8-pole arrangement.

Each tooth 130 and each slot 160 are aligned about respective radial pitch axes 170, which extend perpendicularly and outwardly from a stator-core rotational axis 175 (FIG. 5, extending vertically out of the plane of the figure). Each tooth 130 of the plurality is formed with opposite, lateral-edges 180, 185 that are non-parallel, and symmetrically spaced a variable distance-apart, 190. The distance-apart 190 changes and establishes a variable width along the radial pitch axis 170 of each tooth, as each tooth extends inwardly from and between the root 140 and to the flux-cap 150. In another example, with continued reference to FIGS. 5 and 6, which may be exaggerated to depict relative possible dimensions for purposes of illustration, the variable distance-apart 190 may decrease or increase, and may decrease, increase, and decrease again, or may increase, decrease, and increase again, from root 140 to flux-cap 150. In most applications, a minimum, variable distance-apart 190 along the pitch-axis 170 for each tooth 130, is determined by a flux-saturation requirement during maximum current in stator-core 100, which should be known to those knowledgeable in the field of motor-generator technology.

In one demonstrative configuration, the variable distance-apart 190 of each tooth 130 may range between about 5 mm and about 20 mm, and may be about 10 mm proximate to root 140 and back-iron 145, and between about 2 mm and about 10 mm, and about 3.5 mm proximate to flux-cap 150. In these exemplary configurations, each tooth 130 may have opposite lateral-edges 180, 185 to have respective, symmetrical linear edge-profiles 187 with a slope-angle 195 between the lateral-edges 180, 185, or between each edge and the pitch-axis 170, which slope-angle 195 may range between about one-degree and about 45-degrees, and which be about 20-degrees or so, for purposes of illustration without limitation, and which may be determined to establish a predetermined stiffness and/or mechanical resonance, among other considerations.

In further variations, each tooth 130 may also include a fixed root-radius 200 that may also be variable and change along its edge, and which may be incorporated to further adjust the variable-stiffness and resonances of each tooth 130. The root-radius in one fixed radius example may range between about one-millimeter and 25 mm, or more or less, and which may be about 3 mm or so. In these configurations, an area of the interstitial slots 160 is designed to be as close as possible to prior configurations, such that back-EMF waveforms and slot-filling factors comparable to prior-art cores are preserved, which ensures nearly identical torque output performance of M/Gs using the new and improved stator-core 100. As may be understood from FIGS. 5 and 6, and others in the disclosure, the teeth 130 have a substantially trapezoidal planar shape, which although very different in topology, shape, and performance from prior configurations, may nevertheless be designed to have nearly identical tooth planform area in the plane of the figures such that weight of stator-core 100 may remain substantially the same as prior devices, unless design and performance considerations require higher or lower weights.

For the contemplated configurations of the disclosure, back-iron or annular yoke 145 includes a substantially uniform back-iron width 205 (FIG. 6) that can range between about 4 mm and about 60 mm, and which may typically be about 6 mm. Additionally, the laminations 125 may be formed with an outside diameter 210 (FIG. 5) and an inside diameter 215. The outside diameter 210 may be between about 50 mm and about 300 mm, or more or less depending upon the application. Here, an outside diameter of about 160 mm for the lamination 125 may be utilized. The inside diameter 215 may have similar ranges to something less than that of the outside diameter 210, and may be about 102 mm in an exemplary arrangement. In still other adaptations, the inside diameter 215 may be designed to vary relative to the outside diameter 210 from tooth to tooth and slot to slot, to further adjust stiffness, resonance, topology, shape, and performance.

Consequently, each tooth 130 extends inwardly about 102 mm between root 140 and air-gap surface 155. The flux-cap 150 may be about 6 mm wide, laterally about its air-gap surface 155. In these contemplated configurations, each interstitial slot 160 is defined to have a narrower width proximate the back-iron 145 relative to a wider width proximate to the flux-caps 150. Further, each tooth 130 includes a wider width or distance-apart between the opposite lateral-edges 180, 185, proximate to the root 140, which improves structural performance, fatigue life, and durability of the teeth 130 due to the stress concentrations decreasing from the flux-cap 150 to the root 140. With the new configurations of the disclosure, it is also possible to establish constant-widths of the interstitial slots 160 while achieving the improved variable stiffnesses and resonances, which enables new winding configurations that are unconstrained by the prior-art narrowing slots.

The variable distance-apart 190 is further configured to establish in each tooth a predetermined variable bending moment and variable moment-of-inertia, and is selected to have predetermined electrical steel material properties, which establishes a predetermined, resultant variable tooth-stiffness along the pitch-axis 170, and predetermined mechanical-resonance of the tooth 130 with various fundamental and harmonic natural frequencies, which enable reduction of the NVH for each tooth 130. Using conventional structural analytical methods and engineering design tools, the predetermined mechanical resonance for each tooth 130 can be established to be tuned according to the preferred performance characteristics. For example, those having skill in the technical field of structures design should be well-acquainted with analytical engineering techniques and automated design tools for determining the bending moments, moments-of-inertia, deflections, natural frequencies, and resultant vibrations for each tooth 130, as a cantilevered beam, fixed at one end. Here, each tooth 130 standing alone, and when stacked to form stator-core 100, may be analyzed as such a simple cantilevered beam of changing topology and cross-section, for purposes of predetermining its mechanical resonance during excitation and operation.

This resonance includes various structural or mechanical, natural fundamental and harmonic frequencies, which are a function of the input frequencies arising from operation of M/G. Many well-known treatises addressing such static and dynamic analyses are typically found on the bookshelves of most structural design engineers, and include, for example and among many others, Blevins, Robert D., Formulas for Natural Frequency and Mode Shape. New York, Van Nostrand Reinhold Co., 1979; Gere, J. M., Timoshenko, S. P. Mechanics of Materials. 4th ed. Boston: PWS Publishing Company, 1997; and Voltera, E., Zachmanoglou, E. C. Dynamics of Vibrations. Columbus, Charles E. Merrill Books, Inc., 1965. Additionally, several automated analytical tools are also available, and include, for further example, CATIA and SolidWorks by Dassault Systemes, NX by Siemens PLM Software, and AutoCad by AutoDesk, among many others.

In one configuration, a prior-art stator-core incorporating the stacked prior-art laminations SL of FIGS. 3 and 4 was tested in an M/G configured for use in an HEV. During operation and testing, the prior-art stator-core SL configured according to the preceding examples, exhibited mechanical resonances that included a resonant, vibrational first-order frequency response of about 7.36 kilohertz (KHz). This prior art frequency response is close to and sometimes overlaps the nominal operating, first-order electro-motive excitation frequencies of the stator teeth T of prior art M/G stator-cores SL.

In a different, improved configuration according to the disclosure, stator-core 100 having the stacked laminations 125, being tested in an HEV application, and was found to have resonance with a first-order tooth vibrational frequency response of about 12.96 KHz, which was substantially higher than the nominal, excitation operating frequency on the prior art constant-width stator tooth of the M/G. This upward shift is high-enough to enable substantial dampening by the body and frame of the HEV undergoing the tests, which naturally dampens such higher vibrational frequencies. This testing demonstrated a resonance frequency shift of about 5.6 KHz higher, which was an unexpected and substantial improvement of about 76% (12.96 divided by 7.36) over the prior-art, stator-core SL (having constant width teeth T). This is due to the improved, predetermined variable tooth-stiffness and predetermined mechanical resonance. Further analysis determined that a variable tooth-stiffness for each electrical steel tooth 130 was approximately three times higher than that of the prior-art tooth T.

Further experiments in modifying and optimizing the topology and shape of the opposite lateral-edges 180,185 having variable distances-apart 190, revealed that fundamental and harmonic vibrational frequency shifts from lower resonance ranges to higher resonance ranges can be achieved with shifts that ranged between about 5 KHz and about 8 KHz, or more. When these structural and mechanical topology and tooth-shapes improvements and optimizations where combined with torque ripple reductions and optimizations as described elsewhere herein, significant further improvements were experienced in improved NVH performance due to these improved stator-core designs 100, during nominal M/G operation.

Figures 7, 8, 9:
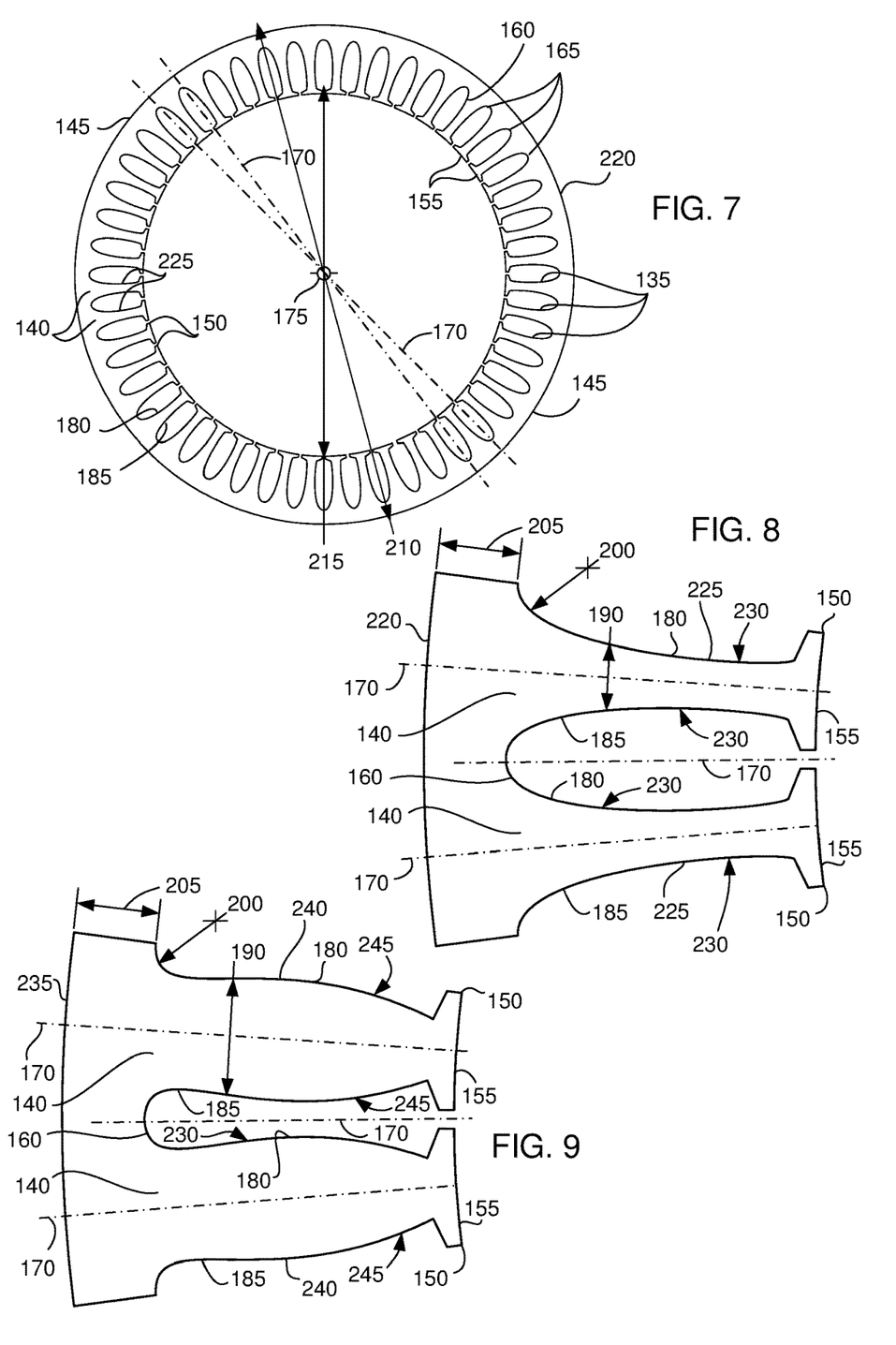
FIG. 7 illustrates a plan view of a single lamination of another improved stator according to the disclosure, which includes a different arrangement of variable width teeth.
FIG. 8 depicts an enlarged plan view of two teeth of the stator of FIG. 7.
FIG. 9 represents an enlarged plan view of two teeth of a modified, improved stator of the disclosure.

In alternative arrangements, and with continuing reference to FIGS. 5 and 6 and now also to FIGS. 7 to 12 (also not to scale, and with certain features illustratively exaggerated), the disclosure further contemplates that each tooth 130 is formed to have the opposite lateral-edges 180, 185, which are symmetrical (FIGS. 5, 6, 7-10) or asymmetrical (FIGS. 11-12) about the radial pitch-axis 170. With reference specifically also now to FIGS. 7 and 8, the disclosure teaches a lamination 220 that is similar to lamination 125, and which includes teeth 225 having each of opposite lateral-edges 180, 185 configured with a symmetrical non-linear, curved edge-profile 230.

Further, these variations, similar in most aspects to lamination 125, may also have the varying lateral-edge distance-apart 190 configured to decrease between and from the root 140 and to the flux-cap 150, such that the distance-apart 190 at the root 140 exceeds the distance-apart 190 at and/or towards the flux-cap 150 along pitch-axis 170. In this way, as with earlier described configurations, the optimal variable tooth-stiffness and predetermined mechanical resonance are also achieved. The distance-apart 190 towards, at, or near the flux-cap 150 is less than the distance-apart 190 at the root 140.

Figures 10, 11:
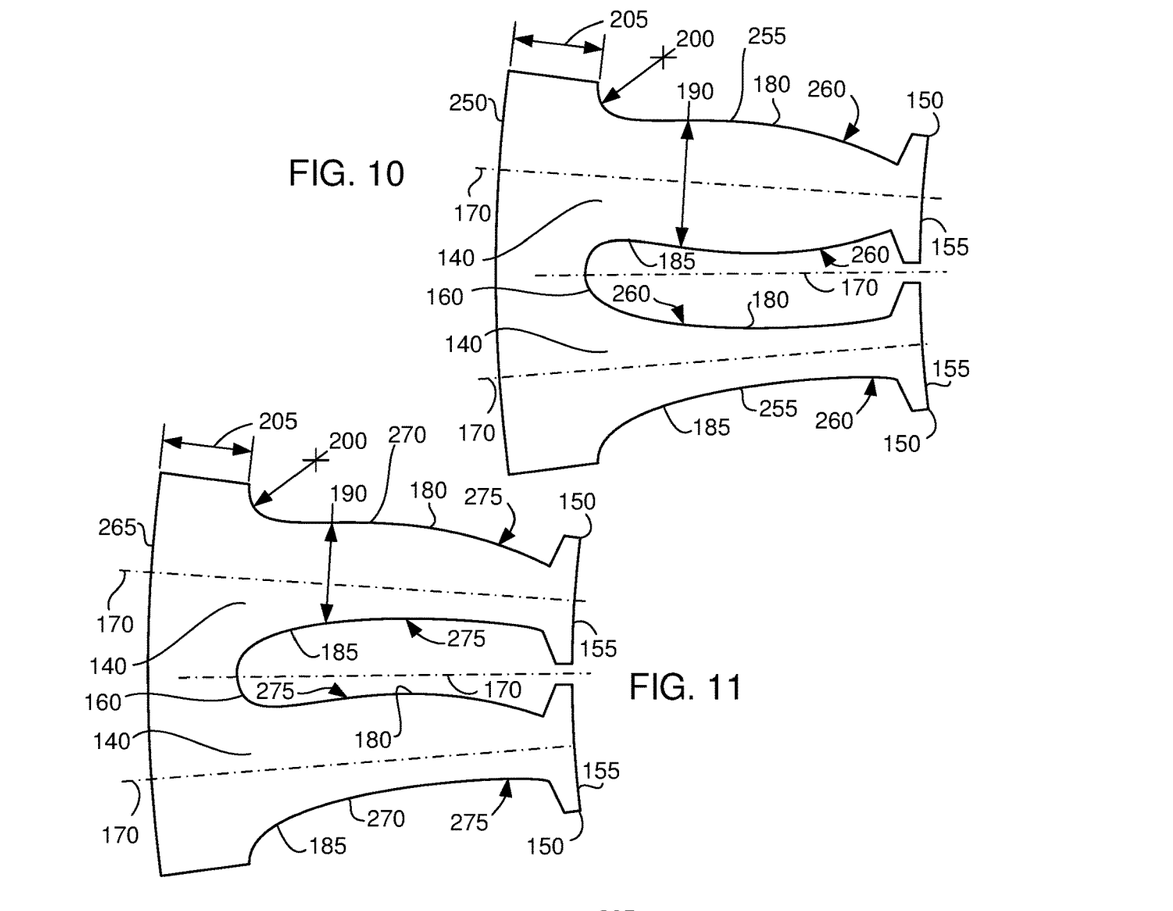
FIG. 10 shows another variation of two teeth in an enlarged plan view of an improved stator according to the disclosure.
FIG. 11 includes an enlarged plan view of a different arrangement of two teeth of an improved stator of the disclosure.
Figure 12:
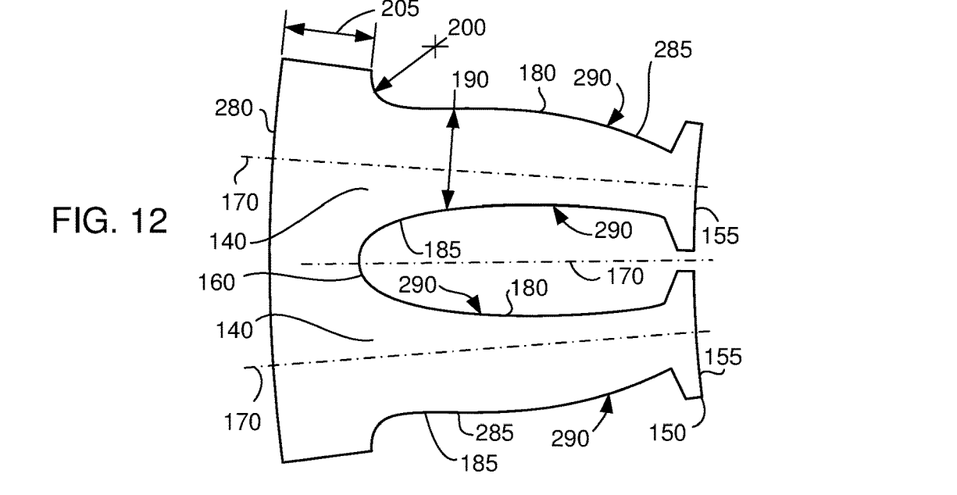
FIG. 12 illustrates an enlarged plan view, according to the disclosure, which depicts another variant of two teeth of an improved stator.

Attention is now also invited to FIG. 9, which includes another modified lamination 235 having teeth 240 with a symmetrical non-linear, curved edge-profile 245, which generally decreases the distance-apart 190 from root 140 or back-iron 145, to flux-cap 150, but which here initially may increase and then decrease as depicted. In further modifications to the arrangements of the disclosure as shown in FIGS. 10, 11, and 12, new laminations 250, 265, and 280 are shown. Each respective tooth 255, 270, and 285 may also have a respective edge-profile 260, 275, and 290 that is different from at least one adjacent tooth 255, 270, and 285, and which may include combinations of symmetrical and asymmetric teeth 255, 270, and 285. In these adaptations, adjacent or neighboring teeth 255, 270, and 285 may be configured to have different respective variable tooth-stiffnesses and different predetermined mechanical resonances. The different respective edge-profiles of adjacent teeth 255, 270, and 285 establish a plurality of variable tooth-stiffnesses and a plurality of predetermined mechanical resonances.

Other modifications include each tooth 255, 270, and 285 in the plurality to also have respective edge-profiles 260, 275, and 290 that may alternate from tooth to tooth between two or more different edge-profiles 260, 275, and 290. The contemplated plurality of teeth 255, 270, and 285 may further include two or more sub-groups of teeth 255, 270, and 285, wherein each sub-group is configured such that each tooth 255, 270, and 285 in the sub-group has respective edge-profiles 260, 275, and 290 that alternate, from one sub-group to the next, between two or more different edge-profiles 260, 275, and 290.

For example, a group of two or three or more adjacent teeth may have similar or identical edge profiles, which a neighboring set or group of two or three or more other teeth may have similar profiles that are different from the other group. Such groups may be devised such that a first group has one or two or more teeth each having a first edge profile, and second, third, or additional groups that may have other respective profiles for the teeth in each such second, third, or additional groups. Symmetry and asymmetry of opposite lateral-edges may be alternated and/or interspersed among such groups. Further, any such teeth may also include one edge profile to be substantially linear, while having the opposite lateral-edge being non-linear. Such arrangements may enable variously tuned mechanical resonances to be predetermined to reduce any particular resonance, amplitude of resonance, or both, of the laminations, laminates, and/or stator-core 100.

The disclosure is further directed to methods of controlling vibration, noise, and harshness of the M/G. One of the methods includes forming the annular stator yoke laminate or lamination 125 to include the plurality of teeth 135, which each extend radially inward from the root 140 of the annular yoke or back-iron 145, to the air-gap surface 155 of the flux-cap 150. As with earlier described configurations, the methods also include establishing the variable tooth-stiffness and the predetermined mechanical-resonance of the tooth 130 by forming each tooth 130 to have the opposite, lateral-edges 180, 185 spaced the distance-apart 190, which changes between the root 140 and the flux-cap 150. In alternative arrangements of the methods, also included is arranging the opposite lateral-edges 180, 185 to have the non-linear, curved edge-profiles 230, 245, 260, 275, 290 having the variable tooth-stiffness and the lateral-edge distance-apart decreasing between the root 140 and the flux-cap 150.

Additional method variations include arranging the opposite lateral-edges 180, 185 to have the linear profile 187 (e.g., FIG. 6) to have the variable tooth-stiffness and the lateral-edge distance-apart 190 decreasing between the root 140 and the flux-cap 150. The disclosure also contemplates the method of controlling vibration including arranging each tooth 130 to have the edge-profile 230, 245, 260, 275, 290 to be different from the at least one adjacent tooth 255, 270, and 285, and configured with the variable tooth-stiffness and the predetermined mechanical resonance that is different from the at least one adjacent tooth 255, 270, and 285. The methods further may include establishing, with the respective edge-profiles 230, 245, 260, 275, 290, the plurality of variable tooth-stiffnesses and the plurality of predetermined mechanical resonances.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric motor/generator, comprising:
   an annular stator yoke lamination;
   a plurality of teeth extending radially inward from a root of the annular stator yoke lamination to a flux-cap, the teeth defining interstitial slots therebetween; and
   each tooth having opposite, lateral-edges spaced a distance-apart that changes between the root and the flux-cap, to establish a variable tooth-stiffness and a predetermined mechanical-resonance of the tooth.

2. The electric motor/generator of claim 1, further comprising:
   the opposite lateral-edges being symmetrical about a radial pitch-axis.

3. The electric motor/generator of claim 1, further comprising:
   the opposite lateral-edges being asymmetrical about a radial pitch-axis.

4. The electric motor/generator of claim 1, further comprising:
   the opposite lateral-edges each configured with a non-linear, curved edge-profile, and having the variable tooth-stiffness and the distance-apart decreasing between the root and the flux-cap.

5. The electric motor/generator of claim 1, further comprising:
   the opposite lateral-edges being non-parallel and each configured with a linear edge-profile having the variable tooth-stiffness and the distance-apart decreasing between the root and the flux-cap.

6. The electric motor/generator of claim 1, further comprising:
each tooth having an edge-profile different from at least one adjacent tooth, and configured with a variable tooth-stiffness and a predetermined mechanical resonance that is different from the at least one adjacent tooth; and
the respective edge-profiles establishing a plurality of variable tooth-stiffnesses and a plurality of predetermined mechanical resonances.

7. The electric motor/generator of claim 1, further comprising:
each tooth in the plurality having respective edge-profiles that alternate from tooth to tooth between two or more different edge-profiles.

8. The electric motor/generator of claim 1, further comprising:
the plurality of teeth including two or more sub-groups of teeth, wherein each sub-group is configured such that each tooth in the sub-group has respective edge-profiles that alternate, from one sub-group to the next, between two or more different edge-profiles.

9. An electric motor/generator, comprising:
a rotor-core received within an annular stator-core;
a plurality of stacked stator laminates forming the annular stator-core, each laminate including a plurality of teeth extending radially inward from a back-iron to an air-gap surface of a flux-cap and defining interstitial slots therebetween; and
each tooth having opposite lateral-edges a distance-apart that varies from the back-iron to the flux-cap and which establishes a variable tooth-stiffness and a predetermined mechanical-resonance of the tooth.

10. The electric motor/generator of claim 9, further comprising:
the opposite lateral-edges being symmetrical about a radial pitch-axis.

11. The electric motor/generator of claim 9, further comprising:
the opposite lateral-edges being asymmetrical about a radial pitch-axis.

12. The electric motor/generator of claim 9, further comprising:
the opposite lateral-edges each configured with a non-linear, curved edge-profile having the variable tooth-stiffness and the distance-apart decreasing between the back-iron and the flux-cap.

13. The electric motor/generator of claim 9, further comprising:
the opposite lateral-edges each configured with a linear edge-profile having the variable tooth-stiffness and the distance-apart decreasing between the back-iron and the flux-cap.

14. The electric motor/generator of claim 9, further comprising:
each tooth having an edge-profile different from at least one adjacent tooth, and configured with a variable tooth-stiffness and a predetermined mechanical resonance that is different from the at least one adjacent tooth; and
the respective edge-profiles establishing a plurality of variable tooth-stiffnesses and a plurality of predetermined mechanical resonances.

15. The electric motor/generator of claim 9, further comprising:
each tooth in the plurality having respective edge-profiles that alternate from tooth to tooth between two or more different edge-profiles.

16. The electric motor/generator of claim 9, further comprising:
the plurality of teeth including two or more sub-groups of teeth, wherein each sub-group is configured such that each tooth in the sub-group has respective edge-profiles that alternate, from one sub-group to the next, between two or more different edge-profiles.

* * * * *